(12) United States Patent
Springer et al.

(10) Patent No.: US 9,238,982 B2
(45) Date of Patent: Jan. 19, 2016

(54) EXHAUST GAS AFTERTREATMENT DEVICE AND METHOD FOR A GASOLINE ENGINE

(75) Inventors: Moritz Klaus Springer, Hagen (DE); Helmut Hans Ruhland, Eschweiler (DE); Thomas Lorenz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 13/476,753

(22) Filed: May 21, 2012

(65) Prior Publication Data

US 2012/0304623 A1    Dec. 6, 2012

(30) Foreign Application Priority Data

Jun. 1, 2011    (DE) .......................... 10 2011 050 788

(51) Int. Cl.
*F01N 3/02* (2006.01)
*F01N 3/10* (2006.01)
*F01N 3/035* (2006.01)

(52) U.S. Cl.
CPC ............. *F01N 3/101* (2013.01); *F01N 3/035* (2013.01); *F01N 2510/0682* (2013.01); *Y02T 10/22* (2013.01)

(58) Field of Classification Search
CPC ..... F01N 3/101; F01N 3/035; B01D 53/9431; B01D 53/9468; B01D 53/9472
USPC .................................................... 60/274, 311
See application file for complete search history.

(56) References Cited

U.S. PATENT DOCUMENTS

| | | | |
|---|---|---|---|
| 5,089,237 A * | 2/1992 | Schuster et al. | 422/180 |
| 5,519,993 A * | 5/1996 | Rao et al. | 60/288 |
| 6,713,031 B2 * | 3/2004 | Harris et al. | 423/239.1 |
| 6,753,294 B1 * | 6/2004 | Brisley et al. | 502/439 |
| 2004/0175315 A1 * | 9/2004 | Brisley et al. | 423/239.1 |
| 2006/0075743 A1 * | 4/2006 | Li et al. | 60/286 |
| 2007/0110650 A1 * | 5/2007 | Pfeifer et al. | 423/213.5 |
| 2010/0205942 A1 * | 8/2010 | Fujiwara et al. | 60/285 |
| 2010/0293930 A1 * | 11/2010 | Li et al. | 60/299 |
| 2011/0073088 A1 * | 3/2011 | Hubbard et al. | 123/703 |
| 2011/0113761 A1 * | 5/2011 | Boorse et al. | 60/297 |
| 2011/0120090 A1 * | 5/2011 | Sorensen, Jr. | 60/274 |
| 2011/0123421 A1 * | 5/2011 | Grubert | 423/212 |
| 2011/0179777 A1 * | 7/2011 | Chandler et al. | 60/297 |
| 2012/0222411 A1 * | 9/2012 | Yano et al. | 60/297 |

FOREIGN PATENT DOCUMENTS

| | | |
|---|---|---|
| EP | 1055805 A1 | 11/2000 |
| EP | 2042225 A1 | 4/2009 |

(Continued)

OTHER PUBLICATIONS

Partial Translation of Office Action of Chinese Application No. 2012101800310, Issued Aug. 5, 2015, State Intellectual Property Office of PRC, 10 Pages.

*Primary Examiner* — Jason Shanske
(74) *Attorney, Agent, or Firm* — Julia Voutyras; Alleman Hall McCoy Russell & Tuttle LLP

(57) ABSTRACT

Embodiments for an exhaust gas aftertreatment device are provided. In one example, an exhaust gas aftertreatment device for a gasoline engine comprises a filter body with porous filter walls through which exhaust gas flows to remove soot, the porous filter walls containing a first catalyst material and having a coating of a second catalyst material on partial areas of the filter walls. In this way, a particulate filter and catalyst may be provided in a common aftertreatment device.

19 Claims, 4 Drawing Sheets

(56) References Cited

FOREIGN PATENT DOCUMENTS

| | | |
|---|---|---|
| EP | 2273079 A1 | 1/2011 |
| JP | 2007069153 A | 3/2007 |
| JP | 2007247652 A * | 9/2007 |
| WO | 2008107423 A1 | 9/2008 |
| WO | WO 2010004320 A2 * | 1/2010 |
| WO | 2011015615 A1 | 2/2011 |
| WO | WO 2011045847 A1 * | 4/2011 |

* cited by examiner

EXHAUST GAS AFTERTREATMENT DEVICE AND METHOD FOR A GASOLINE ENGINE

RELATED APPLICATIONS

The present application claims priority to German Patent Application Number 102011050788.4, filed on Jun. 1, 2011, the entire contents of which are hereby incorporated by reference for all purposes.

FIELD

The disclosure relates to an exhaust gas aftertreatment device for a gasoline engine and to an exhaust gas aftertreatment method for a gasoline engine.

BACKGROUND AND SUMMARY

Internal combustion engines produce soot during the combustion process. This is known for diesel engines and has led to the development of corresponding soot filters and exhaust gas aftertreatment systems for diesel engines. However, internal combustion engines with spark ignition, in particular gasoline engines with direct injection, produce soot particles during operation which may enter the ambient air with the exhaust gas. Even though the amount of soot particles produced in gasoline engines is generally lower than in diesel engines, it is desirable to prevent or at least reduce the release of soot particles and the pollution of the ambient air caused thereby.

Soot particles can be removed from the exhaust gas by a particle filter. Such a particle filter may be an additional component part having a corresponding spatial requirement and additional costs. It is therefore advantageous to integrate the function of the particle filter with the other components for exhaust gas aftertreatment.

It is known from EP 1 055 805 B1, in the case of a diesel engine, to separate the soot in a plurality of successive method stages at a filter element for soot, which filter element is provided with a catalyst coating for oxidation of the nitrogen monoxide contained in the exhaust gas into nitrogen dioxide. According to EP 2 273 079 A1, an exhaust gas aftertreatment device is equipped with an insert which is formed in a section on the inflow side as an oxidation catalyst and in a section on the outflow side as a particle filter. In WO 2008/107423 A1 a diesel particle filter with a filter body formed of a ceramic material is disclosed, which in a filter section comprises planar and porous filter walls for the exhaust gas to flow through and which, in addition to the filter section, comprises a catalytic section having an oxidizing catalyst coating or an NOx storage coating.

In gasoline engines it is known to integrate the function of a corresponding particle filter (gasoline particle filter, GPF) with that of a three-way catalyst (TWC) generally provided in the exhaust gas system in any case in gasoline engines. By applying the catalytically active material of the three-way catalyst to the filter walls of the exhaust gas ducts of a particle filter, however, the resistance posed by the particle filter to the throughflow of the exhaust gas, and thus the exhaust gas counter pressure, would be considerably increased. In contrast to a conventional three-way catalyst, the catalytically active material is therefore introduced into the porous filter walls of the particle filter, thus reducing the pressure loss and therefore the exhaust gas counter pressure.

However, the inventors herein have recognized a few issues with the above approaches. For example, it has been found that the insertion of the catalytic coating in the filter walls of the particle filter (GPF) leads to impaired starting behavior compared to conventional three-way catalysts (TWCs). In particular, a longer period is necessary until a sufficient catalytic effect for conversion of the exhaust gas pollutants is achieved, and therefore the emission of pollutants, in particular hydrocarbons, by motor vehicles provided with such a filter is increased on the whole. It would be possible to improve the starting behavior by increased heating of the exhaust gas aftertreatment device, for example by increasing exhaust gas enthalpy or by electric heating, however fuel consumption would be increased as a result. It would also be possible to improve starting behavior by way of an increased noble metal content of the catalyst material, but this would increase costs.

Thus, embodiments are provided to at least partly address the above issues. In one example, an exhaust gas aftertreatment device for a gasoline engine comprises a filter body with porous filter walls through which exhaust gas flows to remove soot, the porous filter walls containing a first catalyst material and having a coating of a second catalyst material on partial areas of the filter walls.

In this way, particulate matter may be removed from the exhaust via the porous filter walls. Further, the catalyst material contained in the filter walls as well as coating the walls may act to convert emissions in the exhaust. By combining the particulate filter with the catalyst material, a single exhaust aftertreatment device may be provided rather than a separate catalyst and particulate filter, reducing engine packaging space. By coating only partial areas of the filter walls, rapid catalyst light-off may be achieved without increasing exhaust back-pressure excessively, thus avoiding fuel economy penalties.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
FIGS. 1A to 1D show a comparison of different embodiments of catalysts and particle filters according to the prior art (FIGS. 1A to 1C) and an embodiment of a filter body of an exhaust gas aftertreatment device according to the disclosure (FIG. 1D), in each case in the form of schematic cross-sectional views.

The aftertreatment device of the present disclosure includes a filter body, which for example may be comprised of a ceramic material, the substrate, and which for example comprises exhaust gas ducts extending parallel to one another. The partition walls between adjacent exhaust gas ducts are formed as porous filter walls for retaining soot contained in the exhaust gas and are passed through by the exhaust gas. For this purpose, the exhaust gas ducts are closed alternately for example at their outflow-side or inflow-side ends so that the exhaust gas passing from the inflow-side end section to the outflow-side end section of the filter body flows through the filter walls. The filter body is thus formed as a particle filter for the removal of soot from the exhaust gas flow of the gasoline engine.

In accordance with the disclosure the porous filter walls contain a catalyst material of a three-way catalyst, that is to say a catalyst material for obtaining the effect of a three-way catalyst. The catalyst material may contain, in a manner known per se, noble metals such as platinum, palladium and/or rhodium. In addition to the catalyst material contained in the filter walls, a second catalyst material of a three-way catalyst, which may have an identical composition as the former catalyst material, is applied to partial areas of the filter walls, in particular as a coating on the filter walls. The coating may be formed as in a three-way catalyst in a manner known per se. A differing distribution of the catalyst materials may also be used, for example the inlet region may contain more palladium, whereas the fraction of rhodium is increased in the filter walls.

The insertion of the catalyst material into the filter walls does not lead to a considerable increase in the flow resistance of the particle filter. Since a catalyst material of a three-way catalyst is additionally applied to the filter walls, an improved starting behavior of the exhaust gas aftertreatment device is achieved, and in particular an improved catalytic effect is established even before the exhaust gas aftertreatment device has reached its full operating temperature. Since merely partial areas of the filter walls and thus not the entire surface of the filter walls are provided or coated with the catalyst material, there is only a slight increase in flow resistance and therefore merely an increase in the exhaust gas counterpressure which is still acceptable for operation of the gasoline engine. Owing to the disclosure, the effects of a particle filter and of a three-way catalyst are thus combined with one another in an improved manner.

According to an example of the disclosure the additional catalyst material is applied to the filter walls in at least one section of the filter body defined in the direction of flow of the exhaust gas, in particular to corresponding sections of all filter walls of the exhaust gas ducts extending parallel to one another. Simple production is thus enabled and a particularly high level of efficacy for purification of the exhaust gas is achieved.

The catalyst material applied additionally is advantageously applied to the filter walls on both sides in the at least one section of the filter body. The efficacy of the additional catalyst material as a three-way catalyst is thus further improved.

Such a section, in which catalyst material of a three-way catalyst is additionally applied to the partition walls of the exhaust gas ducts of the filter body, that is to say to the filter walls, may be formed for example as the inflow-side or outflow-side end section or else as a central section, viewed in the direction of flow of the exhaust gas, of the filter body. The additional catalyst material may also be applied in a plurality of such sections, wherein at least one section remains free from the additional catalyst material, however.

According to an example of the disclosure, the catalyst material applied additionally is applied to the filter walls in an end section of the filter body on the inflow side. A particularly favorable starting behavior and a particularly high level of efficacy for exhaust gas purification are thus achieved. A further advantage of such an arrangement is the prevention of possible phosphorous poisoning of the catalyst, which may be caused by phosphorous compounds in the exhaust gas and which reduces the efficacy and service life of the exhaust gas aftertreatment device.

According to a further example of the disclosure the catalyst material applied additionally is applied to the filter walls in an end section of the filter body on the outflow side. It is particularly preferable if the additional catalyst material is applied to the filter walls in end sections of the filter body both on the inflow side and on the outflow side. A particularly high catalytic purifying effect and a particularly favorable starting behavior are thus achieved.

The catalyst material contained in the porous filter walls, that is to say in the partition walls between the exhaust gas ducts of the filter body, may advantageously be arranged as a coating on the porous walls located within the filter walls. A particularly high level of efficacy for catalytic exhaust gas purification in the sense of a three-way catalyst is thus achieved without reducing the effect as a soot filter or generating a considerable exhaust gas counter pressure.

In a method according to the disclosure for aftertreatment of the exhaust gas of a gasoline engine, an oxygen content of the exhaust gas is measured and a fuel and/or air feed of the gasoline engine is adjusted to achieve an at least approximately stoichiometric exhaust gas composition. The oxygen content of the exhaust gas may for example be measured using a lambda probe arranged in the exhaust gas flow. The fuel and/or air feed of the gasoline engine can be adjusted in a manner known per se, for example by adapting the amount of fuel injected, so that the exhaust gas has an approximately stoichiometric composition which allows practically complete oxidation of CO and hydrocarbons as well as practically complete reduction of NO by a three-way catalyst. The measurement of the oxygen content and the adjustment for achieving the stoichiometric exhaust gas composition correspond to the lambda adjustment, known per se, of a three-way catalyst.

Furthermore, in a method according to the disclosure the exhaust gas flows through an exhaust gas aftertreatment device which is designed as described above. Soot particles are removed from the exhaust gas by the filter body, which comprises exhaust gas ducts extending parallel to one another, through the walls of which the exhaust gas flows. Owing to the catalyst material arranged within the porous filter walls, the exhaust gas is purified of further pollutants in the manner of a three-way catalyst. As a result of the additional catalyst material applied to sections of the filter walls, the catalytic effect for exhaust gas purification is already available before the catalyst material within the filter walls has reached the full operating temperature.

According to FIG. 1A, a filter body 1 of three-way catalyst known from the prior art contains a plurality of exhaust gas ducts 2 which extend parallel to one another and which are arranged so that the exhaust gas to be purified flows through from an inflow side 3 to an outflow side 4. A catalyst material is arranged within the exhaust gas ducts 2 on the walls 5 formed by a ceramic substrate, said catalyst material for example being applied to a washcoat 6, which for example may be comprised of porous aluminum oxide and cerium (IV) oxide, in which the catalytically active noble metals are incorporated. When the exhaust gas to be purified flows through the three-way catalyst from the inflow side 3 to the outflow side 4, it comes into contact with the catalyst material in the washcoat 6. Owing to the catalytic effect of the noble metals incorporated therein, in particular platinum, palladium and/or rhodium, carbon monoxide and hydrocarbons contained in the exhaust gas for example are oxidized with the aid of oxygen to form carbon dioxide and water, and nitrogen monoxide contained in the exhaust gas is reduced by carbon monoxide to form nitrogen. With a corresponding stoichiometric composition of the exhaust gas, which may be achieved with the aid of lambda adjustment, the aforementioned pollutants can be removed virtually completely from the exhaust gas. For the sake of clarity, not all elements are denoted by their respective reference numerals in FIG. 1A, as is also the case in the other figures.

Figure 1B:
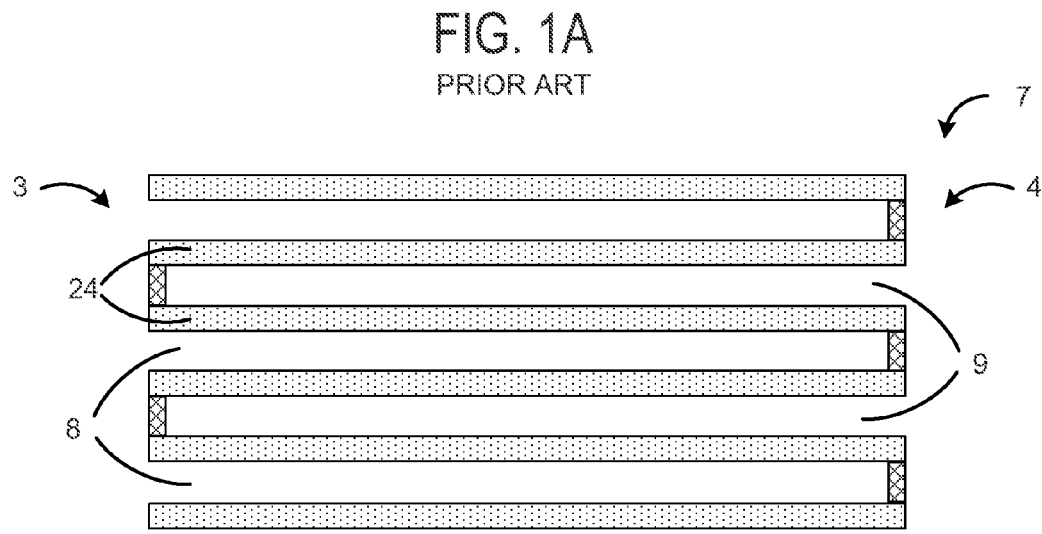

FIG. 1B shows a particle filter known from the prior art and having a filter body 7 which comprises a plurality of first exhaust gas ducts 8 which extend parallel to one another, are open toward the inflow side 3 and closed toward the outflow side 4. The filter body 7 also comprises a plurality of second exhaust gas ducts 9 which extend parallel to one another and to the first exhaust gas ducts 8, are open toward the outflow side 4 and closed toward the inflow side 3. The ceramic substrate of the filter body 7 forms porous partition walls 24 between the first and second exhaust gas ducts 8, 9, which partition walls act as filter walls. On its way from the inflow side 3 to the outflow side 4 of the filter body 7, the exhaust gas flows through the first exhaust gas ducts 8, flows through the porous partition walls 24, wherein soot particles contained in the exhaust gas are retained, and flows on through the second exhaust gas ducts 9. In particular FIG. 1B shows a particle filter for gasoline engines (GPF).

Figure 1C:
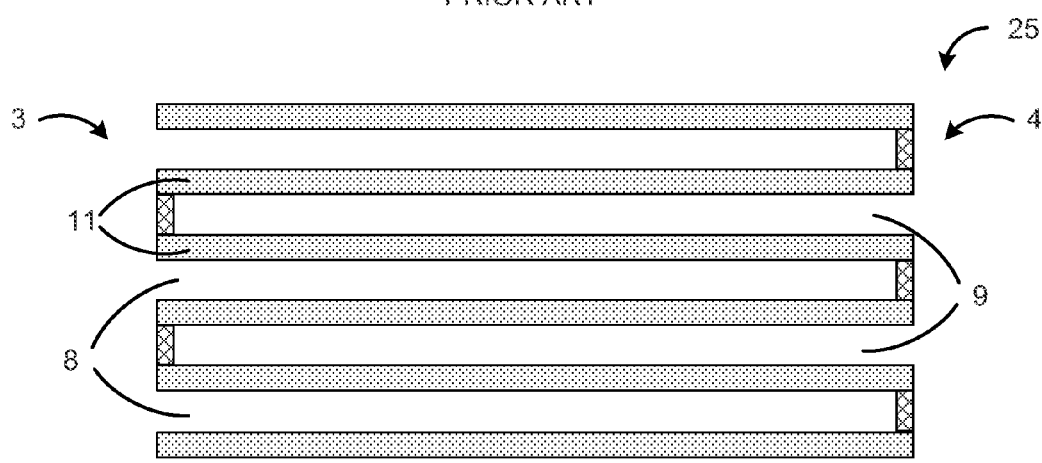

As shown symbolically in FIG. 1C, in a further soot particle filter for gasoline engines (GPF), a material acting catalytically in the sense of a three-way catalyst is contained in the partition walls 11 acting as filter walls. The filter body 25 illustrated in FIG. 1C is otherwise designed similarly to the filter body 7 of the particle filter shown in FIG. 1B. When exhaust gas flows through the filter body 25 from the inflow side 3 to the outflow side 4, said exhaust gas flows through the first exhaust gas ducts 8, the porous partition walls 11 and the second exhaust gas ducts 9, as in the filter body 7 shown in FIG. 1B. When exhaust gas flows through the porous partition walls 11, not only are soot particles contained in the exhaust gas filtered out, but, if the exhaust gas composition is set accordingly, the exhaust gas is also purified by the chemical conversion of further pollutants, as in the three-way catalyst shown in FIG. 1A.

Figure 1D:
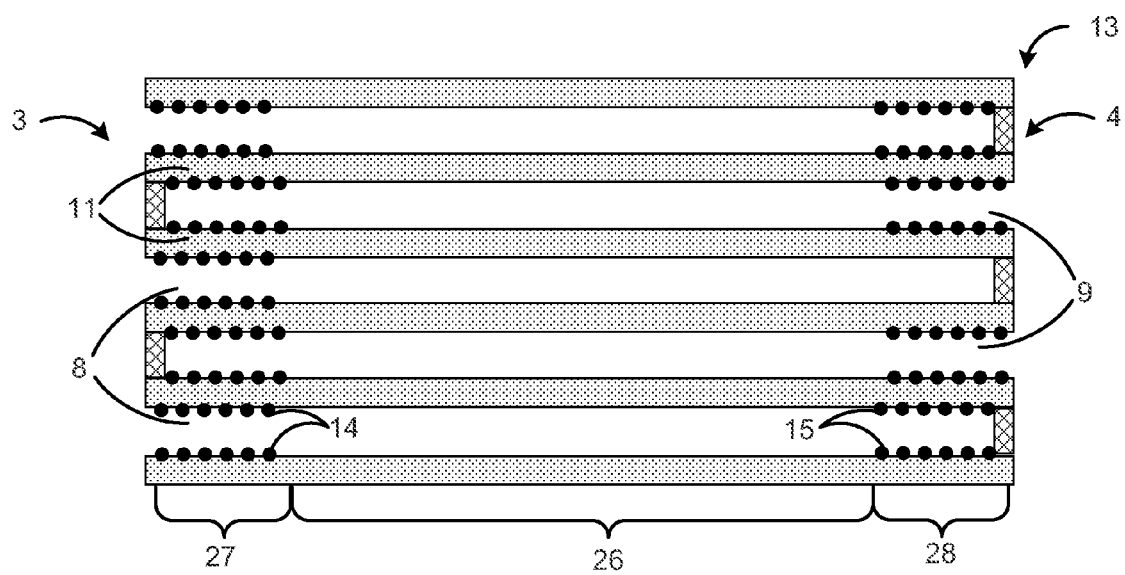

In FIG. 1D an exhaust gas aftertreatment device according to the disclosure is shown which comprises a filter body 13. This is designed similarly to the filter body 25 shown in FIG. 1C, but the partition walls 11 additionally carry a catalyst material in their respective end sections, both on the inflow side 3 and on the outflow side 4. Said catalyst material may have the same composition as the catalyst material which is incorporated into the partition walls 11, and is also used for catalytic conversions as in a three-way catalyst. The additional catalyst material may be incorporated for example in a washcoat 14, 15 applied to the partition walls 11 on both sides. The walls 11 may include an intervening region 26 where no washcoat is applied, thus in the intervening region, the filter walls are not coated with the catalyst material.

If exhaust gas flows through the filter body 13 from the inflow side 3 to the outflow side 4, said exhaust gas thus flows into the first exhaust gas ducts 8, which are open on the inflow side, and passes the washcoat 14 containing the additional catalyst material arranged on the partition walls 11 on the inflow side. The exhaust gas flow then penetrates through the porous partition walls 11, which act as filter walls for the removal of the soot particles contained in the exhaust gas. Lastly, the exhaust gas flows through the second exhaust gas ducts 9, which are open on the outflow side, and passes the washcoat 15, which likewise contains the additional catalyst material, applied to the partition walls 11 on the outflow side. With a corresponding setting of the exhaust gas composition, the exhaust gas is purified of further pollutants as it flows through the partition walls 11 as a result of chemical reactions by the catalyst material contained therein, as is the case in the filter body 25 illustrated in FIG. 1C. In addition, a catalytic purification takes place in the end sections on the inflow and outflow sides when the washcoat 14, 15 with the additional catalyst material is passed; this purification is also particularly effective even before the operating temperature of the catalyst material arranged within the partition walls 11 has been reached.

Thus, in one embodiment, the catalyst material may be present in the aftertreatment device in three regions. A first region includes a coating of catalyst material on the filter walls in an inflow section. A second region includes catalyst material contained within the filter walls. A third region includes a coating of catalyst material on the filter walls in an outflow section. The coating to the filter walls may present additional exhaust back-pressure that degrades fuel economy. Thus, the coating is provided in only the first and third regions. The first and third regions are depicted in FIG. 1D as first region 27 and third region 28. First region 27 may be fully coated with catalyst material. Third region 28 may also be fully coated with catalyst material. Intervening region 26 may not be coated with any catalyst material.

First region 27 may comprise 25% or less of the length of aftertreatment device. That is, for each given filter wall, 25% of the wall on the inflow side (inflow side 3) may be fully coated with catalyst material. However, other percentages are within the scope of this disclosure, such as 15%, 10%, etc. Similarly, third region 28 may comprise 25% or less of the length of the aftertreatment device, in that for each filter wall, 25% or less of the wall on the outflow side may be fully coated with catalyst material. Intervening region 26 may comprise 50% or more of the length of the aftertreatment device. In this way, at least half the length of each filter wall of the aftertreatment is not coated with catalyst material on an exterior of the walls (but may still include catalyst material integrated within the walls). In some embodiments, 75% of the length is not coated in catalyst. In other embodiments, 80% of the length is not coated in catalyst. Further, first region 27 is immediately adjacent to intervening region 26, which is immediately adjacent to third region 28, with no intervening regions between first region 27, intervening region 26, and third region 28. Additionally, in some embodiments, each end face of the aftertreatment device is not coated in catalyst material.

Thus, in one example, an aftertreatment device may include a plurality of filter walls defining inflow ducts and outflow ducts. The first 10% of the exterior of each filter wall may be fully coated with catalyst material on an inflow side. The next 80% of the exterior of each filter wall may not be coated in catalyst material. The last 10% of the exterior of each filter wall may be fully coated with catalyst material on an outflow side. Each end face of the aftertreatment device may not be coated in catalyst material. Further, the filter walls may include catalyst material integrated within the walls. The catalyst material integrated within the walls may be integrated within an entirety of each wall such that all portions of all walls of the aftertreatment device include catalyst within them. However, in other embodiments, only a subset of the portions of the walls may have catalyst integrated within them. For example, only 50% of each wall may include integrated catalyst material. In another example, not every wall may include integrated catalyst material, but instead only a subset of the filter walls may include integrated catalyst material.

Figure 2:
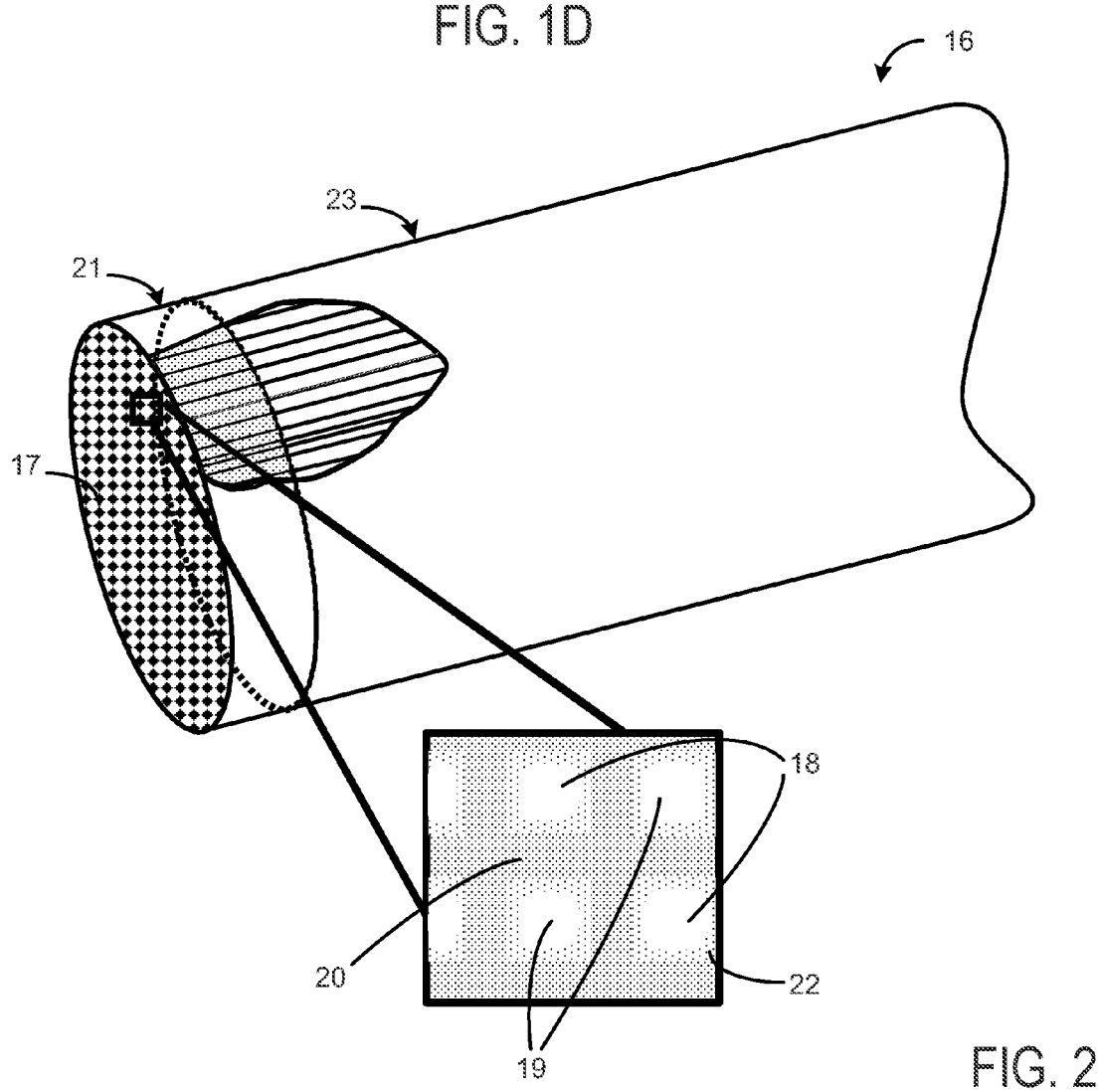
FIG. 2 is a perspective, partly cut-away view of a further embodiment of a filter body of an exhaust gas aftertreatment device according to the disclosure.

A further embodiment of a filter body 16 of an exhaust gas aftertreatment device according to the disclosure is illustrated in FIG. 2. As can be seen on the end face 17 on the inflow side shown in perspective view and in the enlarged detail illustrated, the substrate of the filter body 16 forms tubes or ducts 18, 19 arranged in a lattice-like or honeycombed manner, of which every second duct 18 is open toward to the inflow side. The intermediate ducts 19 are closed toward the inflow side and are open toward the outflow side, whereas the ducts 18 open toward the inflow side are closed toward the outflow side (not shown). The partition walls 20 are porous and contain a catalyst material having the effect of a three-way catalyst or, for example, a material which functions as an $O_2$ or $NO_x$ store. The catalyst material is additionally applied as a coating 22 to the partition walls 20, that is to say to the walls of the ducts 18, 19, in an end section 21 on the inflow side. As indicated by the partly cut-away view in FIG. 2, this coating is not provided in a central section 23 of the filter body 16. An end section of the filter body 16 on the outflow side may be designed similarly to the end section 21 on the inflow side (not shown).

If the exhaust gas flow of a gasoline engine is guided through the filter body 16 via the end face 17 on the inflow side, the exhaust gas thus flows through the ducts 18 which are open on the inflow side, penetrates through the porous partition walls 20 and flows on through the ducts 19 on the outflow side. When exhaust gas flows through the partition walls 20, which act as filter walls, particles contained in the exhaust gas, in particular soot, are removed therefrom and, if the exhaust gas composition is set accordingly, further pollutants are eliminated in the manner of a three-way catalyst. In addition, the further pollutants are removed from the exhaust gas as a result of the contact of the exhaust gas with the catalyst coating 22. The coating 22 acting additionally as a three-way catalyst is already effective in a starting phase of the gasoline engine or of the exhaust gas aftertreatment device, before the catalyst material contained within the filter walls or partition walls 20 has reached the necessary operating temperature. A more favorable starting behavior of the exhaust gas aftertreatment device with the filter body 16 is thus achieved, wherein the coating 22 applied only over sections leads merely to a lesser increase of the counterpressure of the exhaust gas.

Figure 3:
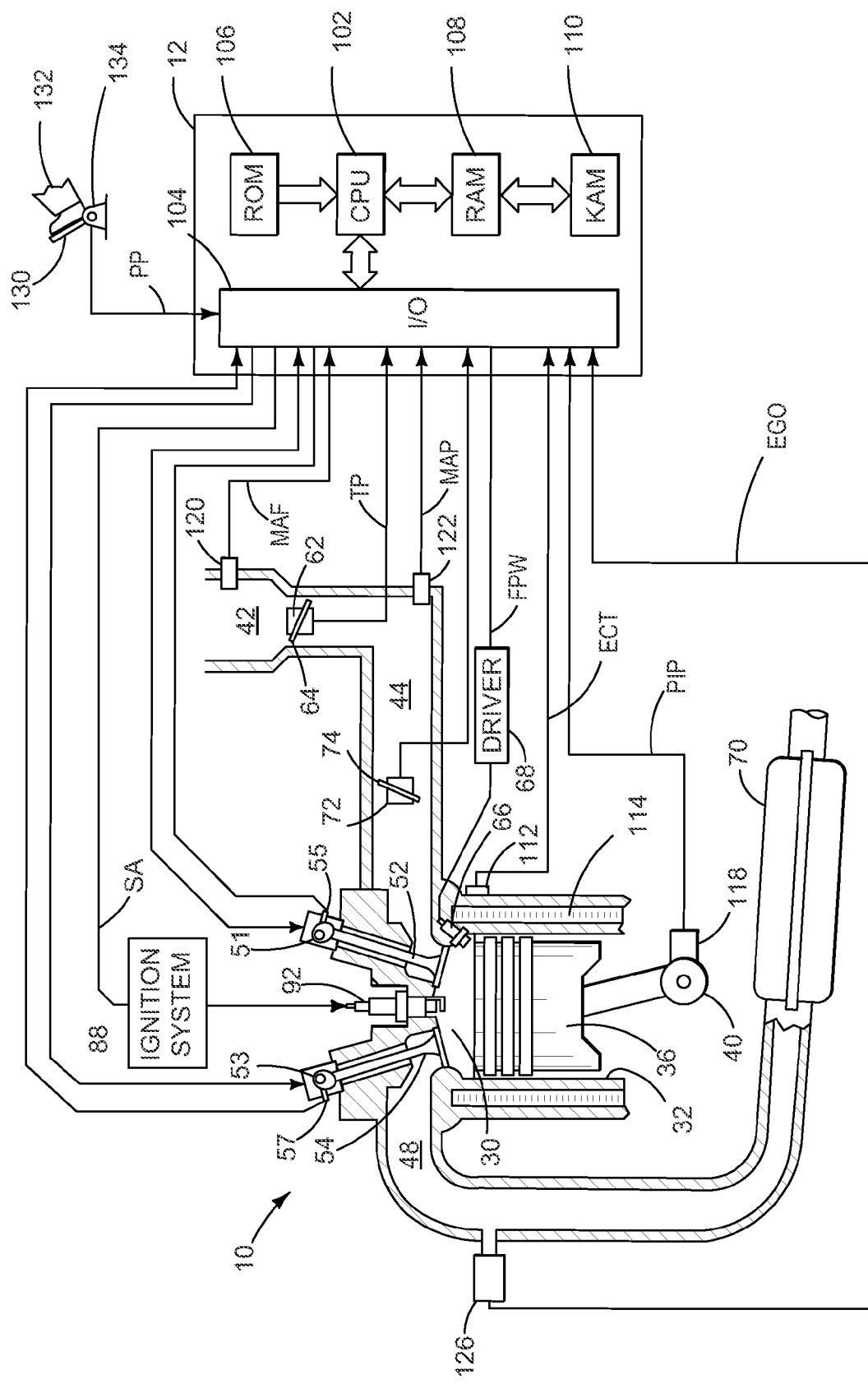
FIG. 3 is schematic depiction of a single cylinder of a multi-cylinder engine.

Referring now to FIG. 3, it includes a schematic diagram showing one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of exhaust aftertreatment device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_R$, HC, or CO sensor. The exhaust system may include light-off catalysts and underbody catalysts, as well as exhaust manifold, upstream and/or downstream air-fuel ratio sensors. Exhaust aftertreatment device 70 may be a gasoline particulate filter with integrated catalyst, such as an aftertreatment device including the filter body 13 of FIG. 1D or filter body 16 of FIG. 2. In other embodiments, exhaust aftertreatment device 70 may be a three way catalyst (TWC), NOx trap, various other emission control devices, or combinations thereof.

Controller 12 is shown in FIG. 3 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the method described below as well as variations thereof.

Figure 4:
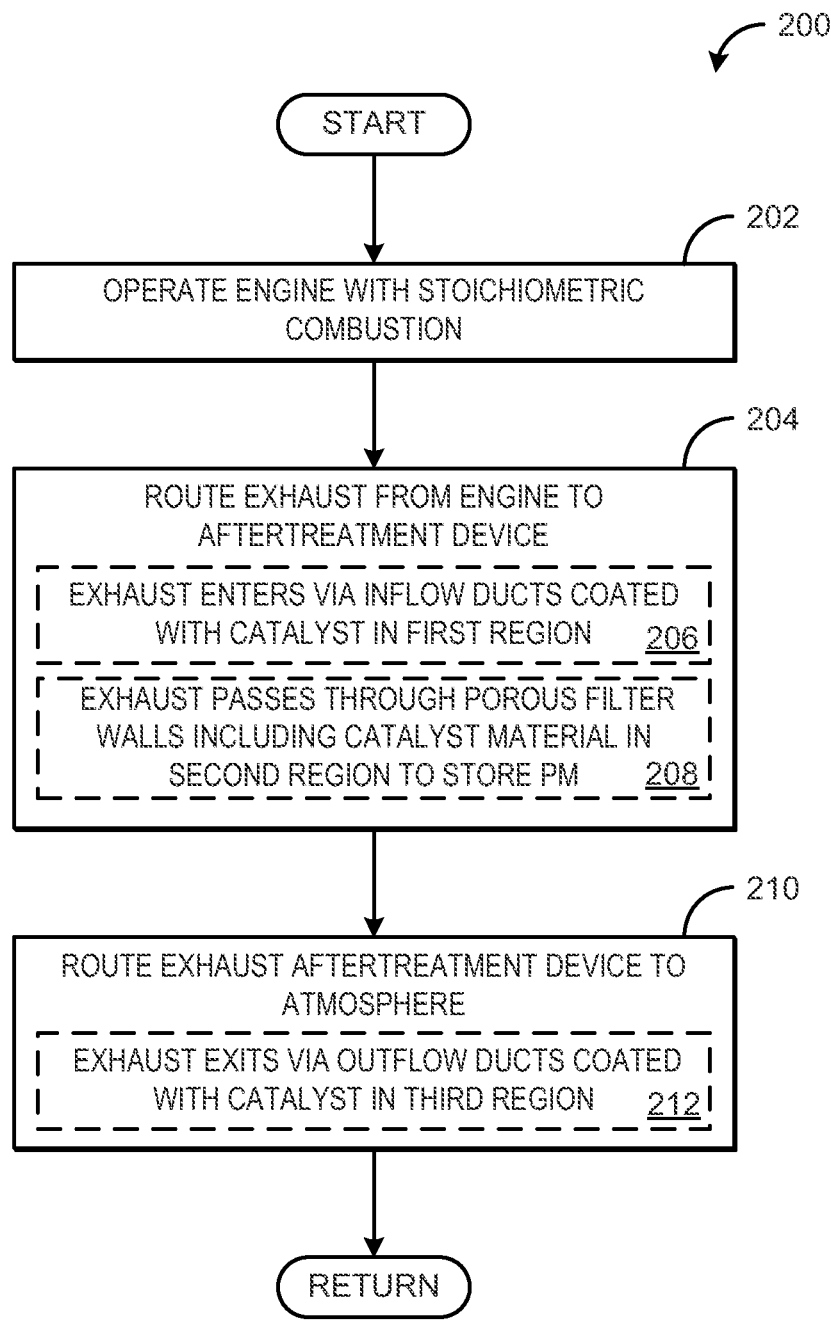
FIG. 4 is a flow chart illustrating a method for operating an engine having an exhaust according to an embodiment of the present disclosure.

FIG. 4 is a flow chart illustrating a method 200 for operating an engine including an exhaust according to an embodiment of the present disclosure. Method 200 comprises, at 202, operating the engine with stoichiometric combustion. Fuel delivered to the engine may be adjusted based on feedback from one or more exhaust gas sensors to maintain air-fuel ratio near stoichiometry. Stoichiometric combustion may provide optimal exhaust gas conditions for converting HC, CO, NOx, etc. in the downstream aftertreatment device.

At 204, exhaust is routed from the engine to an aftertreatment device. The engine may be coupled to an exhaust passage that includes one or more aftertreatment devices configured to remove emissions from the exhaust. The aftertreatment device may include porous filter walls, arranged to provide inflow ducts and outflow ducts, configured to store particulate matter. Further, the aftertreatment device may include one or more catalyst regions to convert emissions in the exhaust. Thus, routing exhaust to the aftertreatment device may include, at 206, the exhaust entering the device via a set of inflow ducts coated with a catalyst material in a first catalyst region. As explained above with respect to FIG. 1D and FIG. 2, the aftertreatment device may include a filter body with a plurality of porous filter walls that define the inflow ducts. The porous filter walls may be comprised of a material that stores particulate matter in the exhaust. Further, the porous filter walls may be coated with a catalyst material, such as platinum, palladium, and/or rhodium in a first catalyst region, such as an end portion on the inflow side. When the exhaust passes through the inflow ducts and over the first catalyst region, the catalyst may convert the emissions in the exhaust to carbon dioxide, water, nitrogen, etc.

Routing the exhaust to the aftertreatment device may also include the exhaust passing through the porous filter walls containing a catalyst material in a second catalyst region at 208. The inflow ducts may include plugs at one end, preventing the exhaust from exiting the ducts. Thus, the exhaust may pass through the porous filter walls, which may trap the particulate matter. Further, the filter walls may also include a catalyst material, similar to the catalyst material coating the filter walls in the inflow ducts. The filter walls may include an inner filter wall coated with the catalyst material.

At 210, method 200 includes routing the exhaust from the aftertreatment device to the atmosphere. This may include, at 212, the exhaust exiting via outflow ducts coated with a catalyst material in a third region. The third region may be end portions of the porous filter walls of the outflow side of the outflow ducts. Method 200 then returns.

Thus, method 200 of FIG. 4 provides for routing engine exhaust through an aftertreatment device. The aftertreatment device may include both porous filter walls for storing particulate matter, and may include catalyst material in one or more regions of the device for converting emissions. For example, the filter walls may contain the catalyst material integrated in the walls. However, the catalyst in the filter walls may have a relatively lengthy light-off time. That is, the catalyst in the filter walls may not warm up rapidly enough to ensure adequate conversion of all emissions in the exhaust following a cold engine start. Thus, the porous filter walls may be coated with the catalyst material in additional regions. In one example, the filter walls may be coated with the catalyst material in a first region where the exhaust first enters the aftertreatment device. The filter walls may alternatively or additionally be coated with the catalyst material in a third region where the exhaust exits the aftertreatment device. In this way, the first and third catalyst regions may achieve faster light-off than the catalyst in the filter walls. However, by only coating the filter walls in the first and/or third regions, increases in exhaust back-pressure that degrade fuel economy may be avoided. The filter walls may include an intervening region, where the walls are not coated with the catalyst material, to provide reduced exhaust back-pressure.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust gas aftertreatment device for a gasoline engine, comprising:
   a filter body with porous filter walls through which exhaust gas flows to remove soot, the filter walls each including a first surface opposite a second surface,
   a first catalyst material at both surfaces of each filter wall and integrated within the filter walls, and
   a second catalyst material on both surfaces of each filter wall coating only partial areas of the filter walls, a portion of the first and second surfaces of each filter wall not coated with any catalyst material.

2. The exhaust gas aftertreatment device as claimed in claim 1, wherein the second catalyst material coats the filter walls in at least one section of the filter body defined in a direction of flow of the exhaust gas.

3. The exhaust gas aftertreatment device as claimed in claim 1, wherein the filter body comprises a plurality of first exhaust gas ducts which extend parallel to one another and are open toward an inflow side of the filter body and closed toward an outflow side of the filter body and a plurality of second exhaust gas ducts which extend parallel to one another and to the first exhaust gas ducts and are open toward the outflow side and closed toward the inflow side.

4. The exhaust gas aftertreatment device as claimed in claim 2, wherein the second catalyst material coats the filter walls in an end section of the filter body on an inflow side of the filter body.

5. The exhaust gas aftertreatment device as claimed in claim 2, wherein the second catalyst material coats the filter walls in an end section of the filter body on an outflow side of the filter body.

6. The exhaust gas aftertreatment device as claimed in claim 1, wherein each porous filter wall contains the first catalyst material.

7. The exhaust gas aftertreatment device as claimed in claim 1, wherein the first catalyst material is comprised of a higher proportion of rhodium than the second catalyst material, and wherein the second catalyst material is comprised of a higher proportion of palladium than the first catalyst material.

8. A method for aftertreatment of exhaust gas of a gasoline engine, comprising:
  measuring an oxygen content of the exhaust gas;
  adjusting a fuel and/or air feed of the gasoline engine to achieve an at least stoichiometric exhaust gas composition; and
  routing the exhaust gas through an exhaust gas aftertreatment device as claimed in claim 1.

9. An engine method, comprising:
  routing exhaust gas into a particulate filter, the particulate filter having a plurality of porous filter walls defining a plurality of inflow and outflow ducts, each filter wall having a first catalyst material integrated therewithin, each inflow duct and each outflow duct comprising a first region coated with a second catalyst material on each surface of each filter wall, a second non-catalyst-coated intervening region on the surfaces of each filter wall, and a third region coated with the second catalyst material on each surface of each filter wall;
  directing the exhaust gas from each inflow duct through the filter walls into one or more adjacent outflow ducts; and
  wherein routing the exhaust gas into the particulate filter includes flowing the exhaust gas over the second catalyst material coating the first region of each inflow duct, and subsequently, after flowing the exhaust gas through the filter walls, flowing the exhaust gas over the second catalyst material coating the third region of each outflow duct.

10. The engine method of claim 9, wherein the first region is arranged on an inflow side of the particulate filter.

11. The engine method of claim 9, wherein the third region is arranged on an outflow side of the particulate filter.

12. A system, comprising:
  a gasoline engine having an exhaust; and
  an aftertreatment device coupled to the exhaust and comprising a plurality of porous filter walls to store particulate matter, each porous filter wall having a first catalyst material integrated therewithin and coated with a second catalyst material only in a first catalyst region on each surface of each filter wall, and a second catalyst region on each surface of each filter wall, the first and second catalyst regions separated by non-catalyst-coated intervening regions on each surface of each filter wall.

13. The system of claim 12, wherein the first catalyst region is an end portion of an inflow side of the aftertreatment device, and wherein the second catalyst region is an end portion of an outflow side of the aftertreatment device.

14. The system of claim 13, wherein the non-catalyst-coated intervening regions comprise at least half a length of the aftertreatment device.

15. The system of claim 13, wherein the first and second catalyst regions each comprise 10% of a length of the aftertreatment device.

16. The system of claim 12, wherein each porous filter wall of the plurality of porous filter walls includes the first catalyst material.

17. The system of claim 12, wherein the second catalyst material comprises one or more of platinum, palladium, and rhodium.

18. The system of claim 12, wherein the aftertreatment device further comprises a first end face and a second end face, and wherein each end face is not coated in any catalyst material.

19. The system of claim 12, wherein a light-off time of the first catalyst material is longer than a light-off time of the second catalyst material.

* * * * *